United States Patent
Lin

(10) Patent No.: US 10,047,786 B2
(45) Date of Patent: Aug. 14, 2018

(54) NUT AND SUPPORT ELEMENT ASSEMBLY STRUCTURE, AND SCREWING-FIXING ASSEMBLY FOR USE WITH THE SAME

(71) Applicant: Jui-Kun Lin, Taichung (TW)

(72) Inventor: Jui-Kun Lin, Taichung (TW)

( * ) Notice: Subject to any disclaimer, the term of this patent is extended or adjusted under 35 U.S.C. 154(b) by 81 days.

(21) Appl. No.: 15/241,514

(22) Filed: Aug. 19, 2016

(65) Prior Publication Data
US 2017/0051779 A1 Feb. 23, 2017

(30) Foreign Application Priority Data

Aug. 20, 2015 (TW) .............................. 104127220 A
May 30, 2016 (TW) .............................. 105116932 A

(51) Int. Cl.
*F16B 27/00* (2006.01)
*F16B 41/00* (2006.01)
*F16B 37/04* (2006.01)

(52) U.S. Cl.
CPC ............ *F16B 41/002* (2013.01); *F16B 27/00* (2013.01); *F16B 37/044* (2013.01)

(58) Field of Classification Search
CPC ...... F16B 27/00; F16B 37/044; F16B 37/045; F16B 37/046; F16B 41/002
USPC .................... 411/85, 191, 427, 430, 432, 438
See application file for complete search history.

(56) References Cited

U.S. PATENT DOCUMENTS

| 2,266,832 A | * | 12/1941 | Tinnerman | F16B 37/044 411/113 |
| 2,409,209 A | * | 10/1946 | Johnson | F16B 37/044 411/111 |
| 2,495,037 A | * | 1/1950 | Tinnerman | F16B 37/044 29/509 |
| 2,875,804 A | * | 3/1959 | Flora | F16B 37/044 411/427 |
| 2,967,556 A | * | 1/1961 | Jaworski | F16B 37/044 411/112 |
| 3,035,624 A | * | 5/1962 | Jaworski | F16B 37/044 411/112 |
| 3,217,585 A | * | 11/1965 | Munse | F16B 37/044 411/432 |

* cited by examiner

*Primary Examiner* — Roberta S Delisle
(74) *Attorney, Agent, or Firm* — Muncy, Geissler, Olds & Lowe, P.C.

(57) ABSTRACT

A nut and support element assembly structure includes: a nut having a screw hole, an end side, and a lateral side; a support element having a bottom resting portion, two end side abutting portions disposed at the end sides of the nut, respectively, and two lateral side clamping portions connected to the end side abutting portions to clamp the nut from the lateral sides. A nut and support element assembly structure includes: a nut having a screw hole, an end side, and a lateral side; a support element having a bottom resting portion, two end side abutting portions disposed at the end sides of the nut, respectively, and two lateral side clamping portions connected to the bottom resting portion to clamp the nut from the lateral sides. A screwing-fixing assembly for use with the nut and support element assembly structure is further provided.

10 Claims, 6 Drawing Sheets

NUT AND SUPPORT ELEMENT ASSEMBLY STRUCTURE, AND SCREWING-FIXING ASSEMBLY FOR USE WITH THE SAME

BACKGROUND OF THE INVENTION

1. Technical Field

The present invention relates to nuts and, more particularly, to a nut and support element assembly structure, and a screwing-fixing assembly for use with the same.

2. Description of Related Art

Conventional nut and support element assembly structures work out well with a resilient support element. However, some assembly structures are intricate, some support elements are poor in providing support, not to mention that some nuts separate from support elements readily.

In view of this, there is still room for improvement in the known drawbacks of conventional nut and support element assembly structures.

SUMMARY OF THE INVENTION

In view of the aforesaid drawbacks of the prior art, it is an objective of the present invention to provide a nut and support element assembly structure, and a screwing-fixing assembly for use with the same, characterized by structural simplicity, strong support, and a slim chance that the nut will separate from the support element.

In order to achieve the above and other objectives, the present invention provides a nut and support element assembly structure, comprising: a nut having a screw hole, an end side, and a lateral side; and a support element having a bottom resting portion, two end side abutting portions connected to the bottom resting portion and disposed at the end sides of the nut, respectively, and two lateral side clamping portions connected to the end side abutting portions to clamp the nut from the lateral sides, respectively.

In order to achieve the above and other objectives, the present invention further provides a nut and support element assembly structure, comprising: a nut having a screw hole, an end side, and a lateral side; and a support element having a bottom resting portion, two lateral side clamping portions connected to the bottom resting portion to clamp the nut from the lateral sides, respectively, and two end side abutting portions connected to the lateral side clamping portions and disposed at the end sides of the nut, respectively.

Preferably, the bottom resting portion of the support element curves outward.

Preferably, the bottom resting portion of the support element laterally forms an extension portion.

Preferably, the end side abutting portions and/or the lateral side clamping portions of the support element are formed from a space.

The present invention further provides a screwing-fixing assembly for use with the nut and support element assembly structure, comprising a fixing unit having a chamber for containing the nut and support element assembly structure, wherein the bottom resting portion of the support element rests on an inner bottom side of the chamber of the fixing unit.

Preferably, each said lateral side clamping portion of the support element extends upward to form a top underpinning portion for underpinning an inner top side of the chamber of the fixing unit.

According to the present invention, the nut and support element assembly structure and the screwing-fixing assembly for use with the same are advantageously characterized in that the shape, structure and resilient restoring force of the support element are effective in achieving structural simplicity, strong support, and a slim chance that the nut will separate from the support element.

Fine structures and features of the nut and support element assembly structure and the screwing-fixing assembly for use with the same according to the present invention are illustrated with embodiments and described in detail later. However, persons skilled in the art understand that the detailed description and specific embodiments of the present invention are illustrative of the present invention rather than restrictive of the scope of the claims of the present invention.

DETAILED DESCRIPTION OF THE EMBODIMENT OF THE INVENTION

Directional adjectives, such as "inner," "on" and "upward," used herein must be interpreted with reference to the directions adopted in the accompanying drawings.

Technical features of the present invention are illustrated with embodiments, depicted in the accompanying drawings, and described hereunder.

Figure 1:
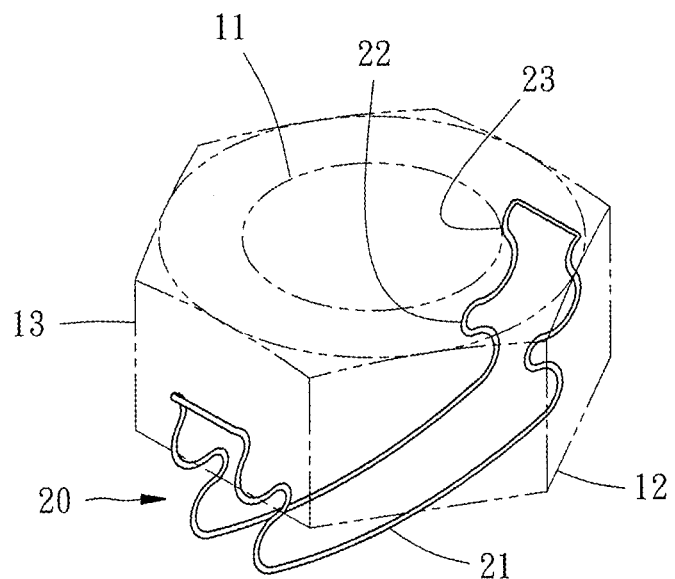
FIG. 1 is a perspective view according to a preferred embodiment of the present invention.

Referring to FIG. 1, in a preferred embodiment of the present invention, a nut and support element assembly structure comprises a nut 10 and a support element 20.

The nut 10 has two end sides 12 and a plurality of lateral sides 13.

The support element 20 has a bottom resting portion 21, two end side abutting portions 22 disposed at the end sides 12 of the nut 10, respectively, and two lateral side clamping portions 23 connected to the end side abutting portions 22 to clamp the nut 10 from the lateral sides 13, respectively.

Therefore, not only are the nut 10 and the support element 20 put together, but the support element 20 also resiliently deforms and restores its shape under predetermined forces to thereby prevent the nut 10 and the support element 20 from separating, thereby meeting various needs to perform an assembly process with a bolt 40.

Furthermore, being capable of resilient deformation and restoration, the support element 20 suits different nuts of similar dimensions.

Figure 2:
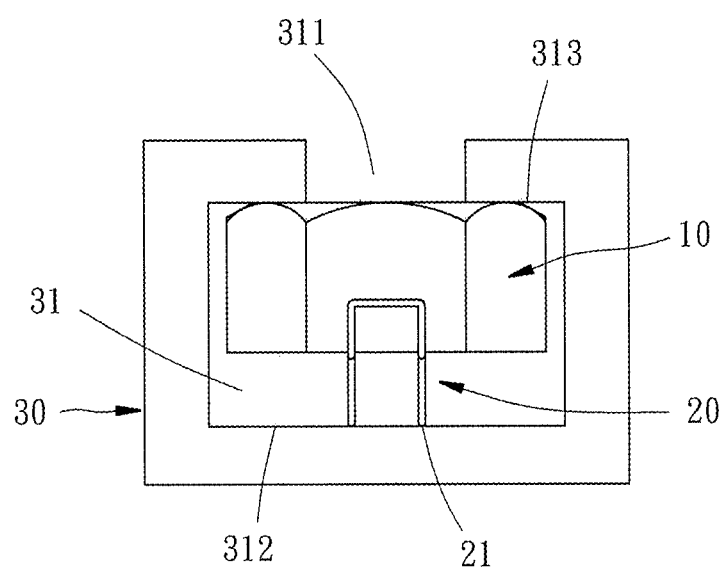
FIG. 2 is a cross-sectional view of a screwing-fixing assembly according to a preferred embodiment of the present invention.
Figure 3:
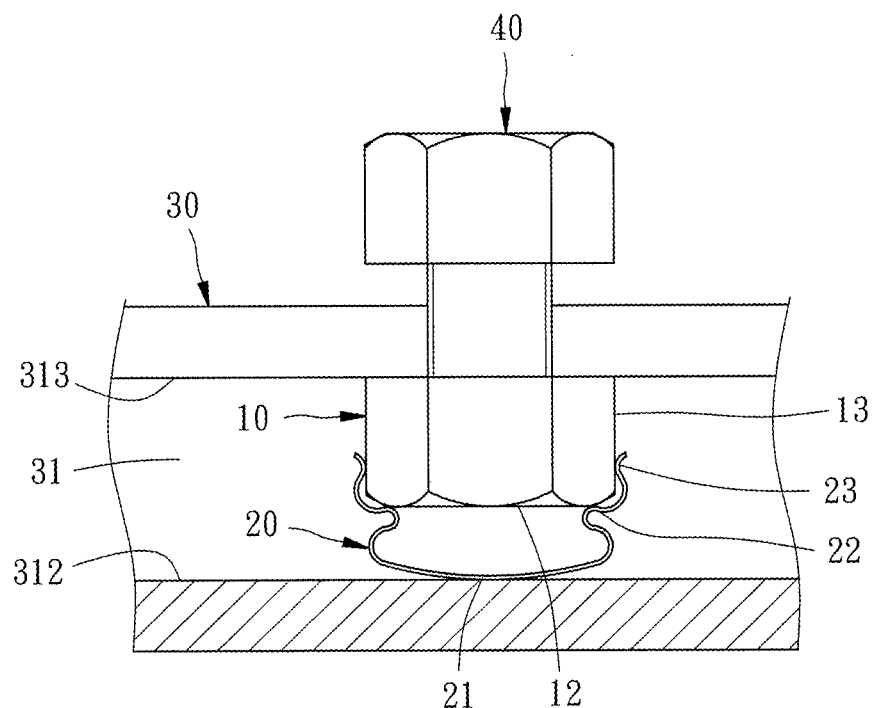
FIG. 3 is a cross-sectional view of the screwing-fixing assembly according to a preferred embodiment of the present invention.

Referring to FIG. 2 and FIG. 3, the present invention further provides a screwing-fixing assembly for use with the nut and support element assembly structure. The screwing-fixing assembly comprises a fixing unit 30.

The fixing unit 30 has a chamber 31 for containing the nut and support element assembly structure. In a preferred embodiment of the present invention, the chamber 31 is a T-shaped chamber. The lateral sides 13 of the nut 10 correspond in position to the inner sidewall of the chamber 31. The chamber 31 has an opening 311, an inner bottom side 312, and an inner top side 313. The opening 311 admits the nut and support element assembly structure. The bottom resting portion 21 of the support element 20 rests on the inner bottom side 312.

Therefore, the screwing-fixing assembly achieves the objective of the present invention.

Figure 4:
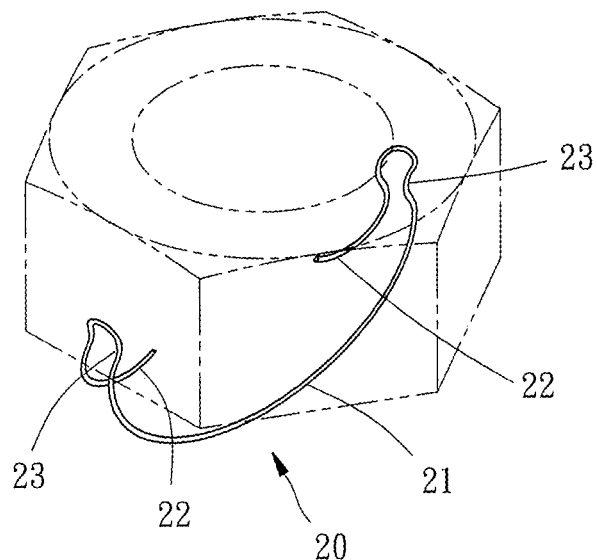
FIG. 4 is a perspective view according to another preferred embodiment of the present invention.

Referring to FIG. 4, in another preferred embodiment of the present invention, the nut and support element assembly structure comprises a nut 10 and a support element 20.

The nut 10 has a screw hole 11, an end side 12, and a lateral side 13.

The support element 20 has a bottom resting portion 21, two lateral side clamping portions 23 connected to the bottom resting portion 21 to clamp the nut 10 from the lateral sides 13, respectively, and two end side abutting portions 22 connected to the lateral side clamping portions 23 and disposed at the end sides 12 of the nut 10, respectively.

Hence, although the support element 20 in this embodiment and the support element 20 in the preceding embodiment differ in shape slightly, they serve to achieve the objective of the present invention.

In each preceding embodiment, the support element 20 is made of a resilient steel wire which is bent to take on its predetermined shape, and thus the support element 20 is advantageously lightweight, easy to shape, conducive to material saving, and capable of resilient clamping.

Figure 5:
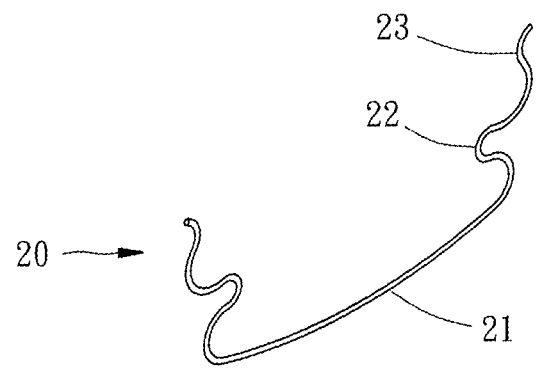
FIG. 5 is a perspective view of a support element according to another embodiment of the present invention.
Figure 6:
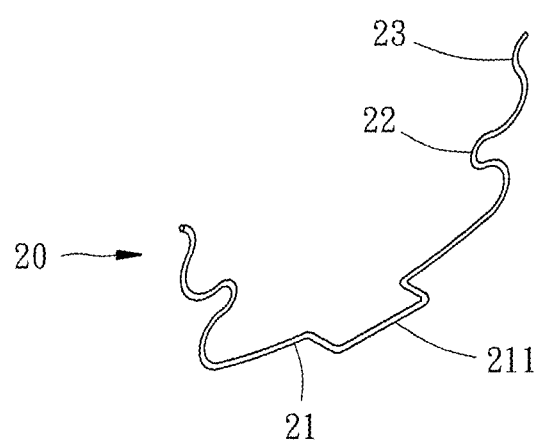
FIG. 6 is a perspective view of the support element according to yet another embodiment of the present invention.

Referring to FIG. 5 and FIG. 6, the support element 20 is made of a single resilient steel wire bent without forming a loop or being closed, thereby attaining structural simplicity.

Figure 7:
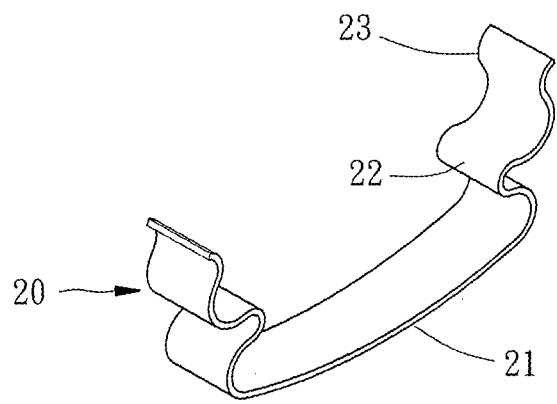
FIG. 7 is a perspective view of the support element according to yet another embodiment of the present invention.

Referring to FIG. 7, in a preferred embodiment of the present invention, the distinguishing technical features of the nut and support element assembly structure are described below.

The support element 20 is a plate that also has a bottom resting portion 21, two end side abutting portions 22 disposed at the end sides 12 of the nut 10, respectively, two lateral side clamping portions 23 connected to the end side abutting portions 22 to claim the nut 10 from the lateral sides 13, respectively.

Figure 8:
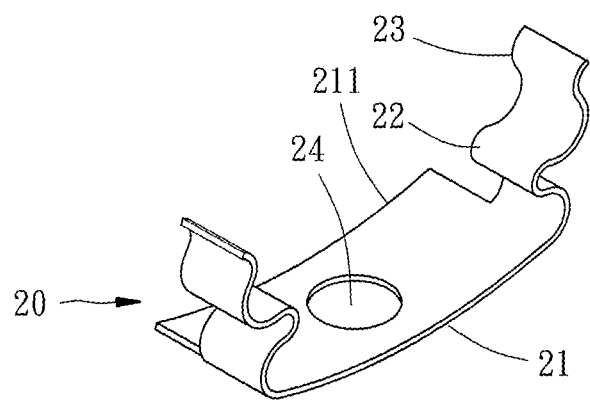
FIG. 8 is a perspective view of the support element according to a further embodiment of the present invention.

Referring to FIG. 8, the bottom resting portion 21 has an extension portion 211 and a through hole 24.

Figure 9:
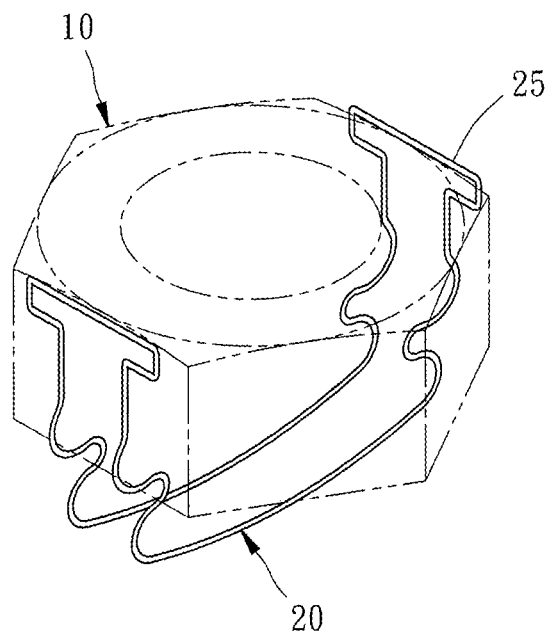
FIG. 9 is a perspective view of the support element according to a further embodiment of the present invention.
Figure 10:
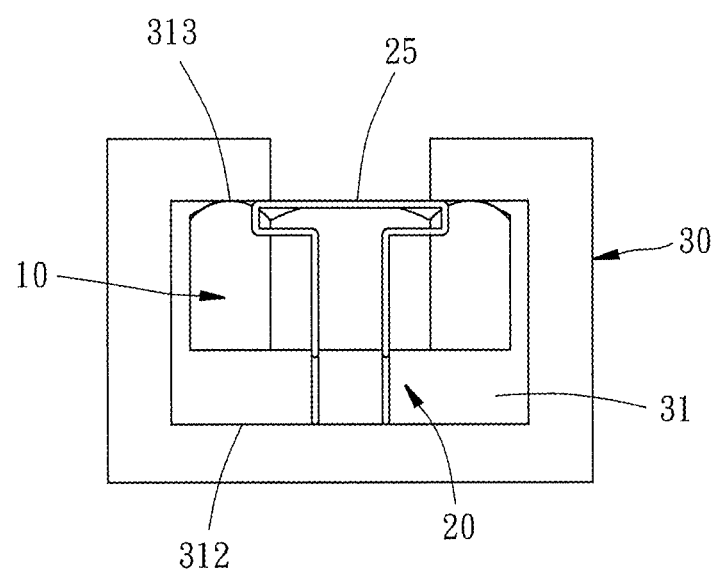
FIG. 10 is a schematic view of the support element assembled according to a further embodiment of the present invention.

Referring to FIG. 9 and FIG. 10, in a further embodiment of the present invention, the screwing-fixing assembly for use with the nut and support element assembly structure comprises a fixing unit 30.

The fixing unit 30 has a chamber 31 for containing the nut and support element assembly structure. The bottom resting portion 21 of the support element 20 rests on an inner bottom side 312 of the chamber 31 of the fixing unit 30.

The lateral side clamping portions 23 of the support element 20 each extend upward to form a top underpinning portion 25. The top underpinning portions 25 of the support element 20 underpin an inner top side 313 of the chamber 31 of the fixing unit 30.

Therefore, with the bottom resting portion 21 and the top underpinning portions 25, it is feasible for the support element 20 to be fitted inside the chamber 31 of the fixing unit 30 in a manner that the support element 20 is fixed in place but can be moved with a finger or tool to a new position.

The aforesaid technical feature "the top underpinning portions 25 underpin an inner top side 313 of the chamber 31 of the fixing unit 30" may be incorporated into the preceding embodiments, without being depicted in the accompanying drawings for the sake of brevity.

Figure 11:
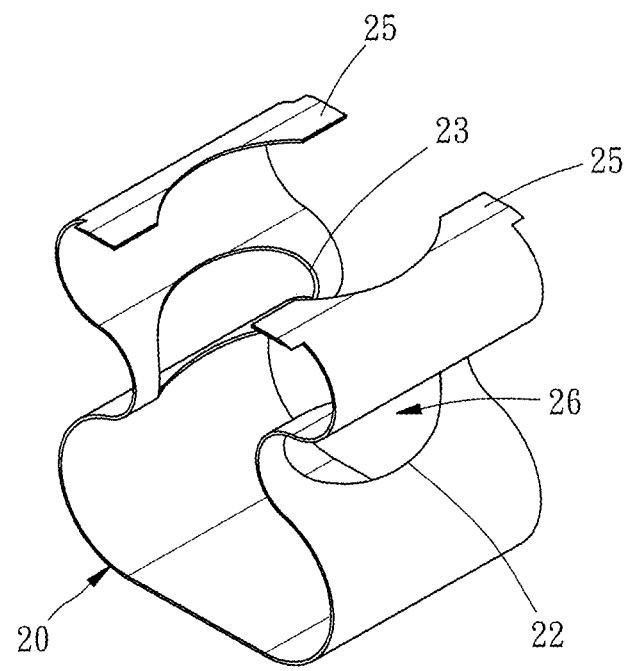
FIG. 11 is a perspective view of the support element according to a further embodiment of the present invention.
Figure 12:
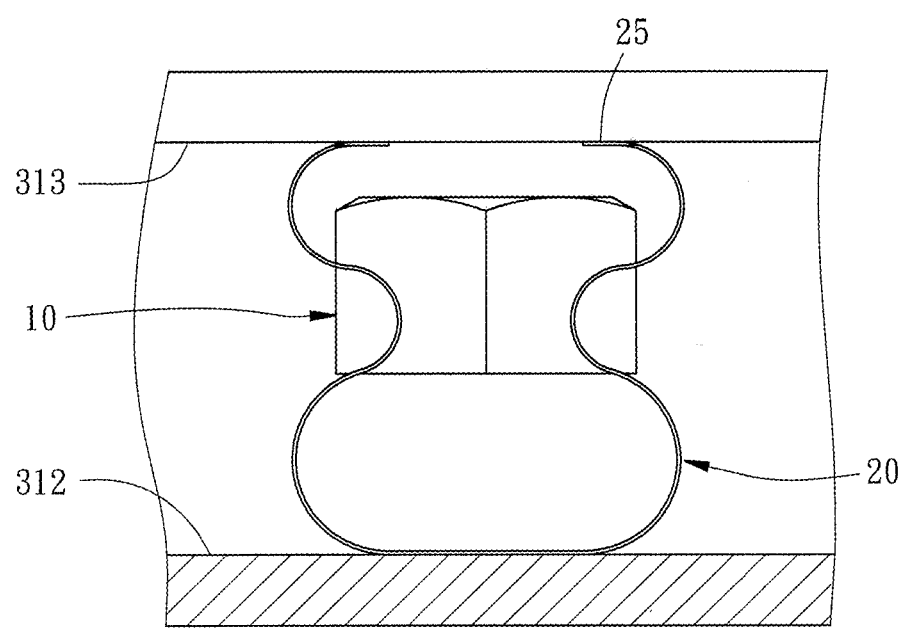
FIG. 12 is a schematic view of the support element assembled according to a further embodiment of the present invention.

Referring to FIG. 11 and FIG. 12, in a further embodiment of the present invention, the distinguishing technical features of the nut and support element assembly structure and the screwing-fixing assembly for use with the same are described below.

The end side abutting portions 22 and/or the lateral side clamping portions 23 of the support element 20 are formed from a space 26 so that a plate manufacturing process is easy; however, the present invention is not restricted to plates, as the aforesaid structure may still be formed by bending a rod or wire.

In addition to the preceding embodiments, the present invention comes with a combination or replacement of embodiments as described below.

For instance, the end sides 12 of the nut 10 is not only horizontal but also oblique or curved, whereas the present invention is not necessarily restricted to the middle of the end sides 12 but may cover the junction of the end side 12 and the lateral sides 13.

Alternatively, the end sides 12 of the nut 10 are provided in a plural number and each dedicated to the support element 20.

The objective of the present invention is achieved by each, or a combination, of the aforesaid embodiments.

In conclusion, according to the present invention, a nut and support element assembly structure and a screwing-fixing assembly for use with the same are characterized by structural simplicity, strong support, and a slim chance that the nut will separate from the support element, thereby achieving the objective of the present invention.

What is claimed is:

1. A screwing-fixing assembly for use with a nut and support element assembly structure, the nut and support element assembly structure, comprising a nut (10) having a screw hole (11), an end side (12), and a lateral side (13); and a support element (20) having a bottom resting portion (21), two end side abutting portions (22) connected to the bottom resting portion (21) and disposed at the end sides (12) of the nut (10), respectively, and two lateral side clamping portions (23) connected to the end side abutting portions (22) to clamp the nut (10) from the lateral sides (13), respectively;

the screwing-fixing assembly comprising a fixing unit (30) having a chamber (31) for containing the nut and support element assembly structure, wherein the bottom resting portion (21) of the support element (20) rests on an inner bottom side (312) of the chamber (31) of the fixing unit (30).

2. The screwing-fixing assembly of claim 1, wherein each said lateral side clamping portion (23) of the support element (20) extends upward to form a top underpinning portion (25) for underpinning an inner top side (313) of the chamber (31) of the fixing unit (30).

3. The screwing-fixing assembly of claim 1, wherein the bottom resting portion (21) of the support element (20) curves outward.

4. The screwing-fixing assembly of claim 1, wherein the bottom resting portion (21) of the support element (20) laterally forms an extension portion (211).

5. The screwing-fixing assembly of claim 1, wherein the end side abutting portions (22) and/or the lateral side clamping portions (23) of the support element (20) are formed from a space (26).

6. A screwing-fixing assembly for use with a nut and support element assembly structure, the nut and support element assembly structure, comprising a nut (10) having a screw hole (11), an end side (12), and a lateral side (13); and a support element (20) having a bottom resting portion (21), two lateral side clamping portions (23) connected to the bottom resting portion (21) to clamp the nut (10) from the lateral sides (13), respectively, and two end side abutting portions (22) connected to the lateral side clamping portions (23) and disposed at the end sides (12) of the nut (10), respectively; the screwing-fixing assembly comprising a fixing unit (30) having a chamber (31) for containing the nut and support element assembly structure, wherein the bottom resting portion (21) of the support element (20) rests on an inner bottom side (312) of the chamber (31) of the fixing unit (30).

7. The screwing-fixing assembly of claim 6, wherein each said lateral side clamping portion (23) of the support element (20) extends upward to form a top underpinning portion (25) for underpinning an inner top side (313) of the chamber (31) of the fixing unit (30).

8. The screwing-fixing assembly of claim 6, wherein the bottom resting portion (21) of the support element (20) curves outward.

9. The screwing-fixing assembly of claim 6, wherein the bottom resting portion (21) of the support element (20) laterally forms an extension portion (211).

10. The screwing-fixing assembly of claim 6, wherein the end side abutting portions (22) and/or the lateral side clamping portions (23) of the support element (20) are formed from a space (26).

\* \* \* \* \*